(12) United States Patent
Ichiryu

(10) Patent No.: US 12,194,782 B2
(45) Date of Patent: Jan. 14, 2025

(54) MOTORCYCLE TIRE

(71) Applicant: Sumitomo Rubber Industries, Ltd., Kobe (JP)

(72) Inventor: Yutaka Ichiryu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 323 days.

(21) Appl. No.: 17/691,254

(22) Filed: Mar. 10, 2022

(65) Prior Publication Data

US 2022/0332146 A1 Oct. 20, 2022

(30) Foreign Application Priority Data

Apr. 8, 2021 (JP) ................................. 2021-066060

(51) Int. Cl.
*B60C 11/03* (2006.01)
*B60C 11/13* (2006.01)
*B60C 19/00* (2006.01)

(52) U.S. Cl.
CPC ........ *B60C 11/0302* (2013.01); *B60C 11/032* (2013.01); *B60C 11/033* (2013.01);
(Continued)

(58) Field of Classification Search
CPC ............ B60C 11/0302; B60C 11/1369; B60C 11/033; B60C 11/032; B60C 2011/0365;
(Continued)

(56) References Cited

U.S. PATENT DOCUMENTS

| 4,614,215 A * | 9/1986 | Osawa | B60C 3/04 |
| | | | 152/538 |
| 2010/0282390 A1* | 11/2010 | Mariani | B60C 11/0311 |
| | | | 152/454 |

(Continued)

FOREIGN PATENT DOCUMENTS

| CN | 104029567 A | * | 9/2014 |
| JP | 03-044002 U | * | 4/1991 |

(Continued)

OTHER PUBLICATIONS

Machine translation for Japan 2007-099147 (Year: 2024).*

(Continued)

*Primary Examiner* — Steven D Maki
(74) *Attorney, Agent, or Firm* — Birch, Stewart, Kolasch & Birch, LLP

(57) ABSTRACT

A motorcycle tire includes a tread portion including a crown portion that is a region of 50% of a tread development width centered on a tire equator, a first shoulder portion that is an outer region of the crown portion, and first lateral grooves. Each lateral groove includes a first groove portion in the crown portion, a second groove portion in the first shoulder portion, and a third groove portion connecting the first and second groove portions. A groove depth and a groove width of the third groove portion are respectively smaller than groove depths and groove widths of the first groove portion and the second groove portion, respectively. More than 80% of a tire axial length of the third groove portion is in the first shoulder portion.

19 Claims, 5 Drawing Sheets

(52) U.S. Cl.
CPC ........ *B60C 11/1369* (2013.01); *B60C 19/001* (2013.01); *B60C 2011/0353* (2013.01); *B60C 2011/0355* (2013.01); *B60C 2011/0358* (2013.01); *B60C 2011/0362* (2013.01); *B60C 2011/0365* (2013.01); *B60C 2011/0369* (2013.01); *B60C 2011/0381* (2013.01)

(58) Field of Classification Search
CPC ..... B60C 2011/0369; B60C 2011/0358; B60C 19/001
See application file for complete search history.

(56) References Cited

U.S. PATENT DOCUMENTS

| | | | |
|---|---|---|---|
| 2014/0190607 A1* | 7/2014 | Matsunami | B60C 11/1369 152/209.11 |
| 2016/0221398 A1 | 8/2016 | Otani et al. | |
| 2019/0176525 A1 | 6/2019 | Nakagawa | |
| 2020/0282774 A1 | 9/2020 | Hikita | |
| 2020/0282775 A1 | 9/2020 | Hikita | |

FOREIGN PATENT DOCUMENTS

| | | | |
|---|---|---|---|
| JP | 2007-099147 A | * | 4/2007 |
| JP | 2019-104329 A | | 6/2019 |
| WO | WO 2021/060033 A1 | | 4/2021 |

OTHER PUBLICATIONS

Machine translation for China 104029567 (Year: 2024).*
Extended European Search Report for European Application No. 22160039.8, dated Aug. 3, 2022.

* cited by examiner

MOTORCYCLE TIRE

RELATED APPLICATIONS

This application claims the benefit of foreign priority to Japanese Patent Application No. JP2021-066060, filed Apr. 8, 2021, which is incorporated by reference in its entirety.

FIELD OF THE INVENTION

The present disclosure relates to a motorcycle tire.

BACKGROUND OF THE INVENTION

Patent document 1 below discloses a motorcycle tire with a tread portion which is provided with main grooves and narrow grooves. The main grooves include first main grooves and second main grooves located outward in the tire axial direction than the first main grooves. The narrow grooves include open narrow grooves and semi-open narrow grooves. The open narrow grooves each have one end connected to one of the main grooves and the other end connected to one of the second main grooves.

Patent Document

[Patent document 1] Japanese Unexamined Patent Application Publication 2019-104329

SUMMARY OF THE INVENTION

Generally, in order to improve drainage of tires, it is effective that long and wide grooves which extend from a crown region to a shoulder region are provided in a tread ground contact patch. On the other hand, such a groove tends to deform largely the surface of the tread portion when coming into contact with the ground, which may bring undesirable vibration during running and uneven wear. In particular, this tendency is remarkable in bias tires, which have lower tread rigidity than radial tires. Accordingly, it has been required to improve drainage of the tire without impairing uneven wear resistance and vibration resistance.

The present disclosure has been made in view of the above circumstances and has a major object to provide a motorcycle tire capable of improving drainage without impairing uneven wear resistance and vibration resistance.

In one aspect of the present disclosure, a motorcycle tire includes a tread portion including a crown portion that is a region of 50% of a tread development width centered on a tire equator, a first shoulder portion that is an outer region of the crown portion, and a plurality of first lateral grooves, each of the plurality of first lateral grooves including a first groove portion arranged in the crown portion, a second groove portion arranged in the first shoulder portion, and a third groove portion connecting the first groove portion and the second groove portion, wherein a groove depth and a groove width of the third groove portion are respectively smaller than a groove depth and a groove width of the first groove portion, the groove depth and the groove width of the third groove portion are respectively smaller than a groove depth and a groove width of the second groove portion, and more than 80% of a tire axial length of the third groove portion is located in the first shoulder portion.

DETAILED DESCRIPTION OF THE INVENTION

Figure 1:
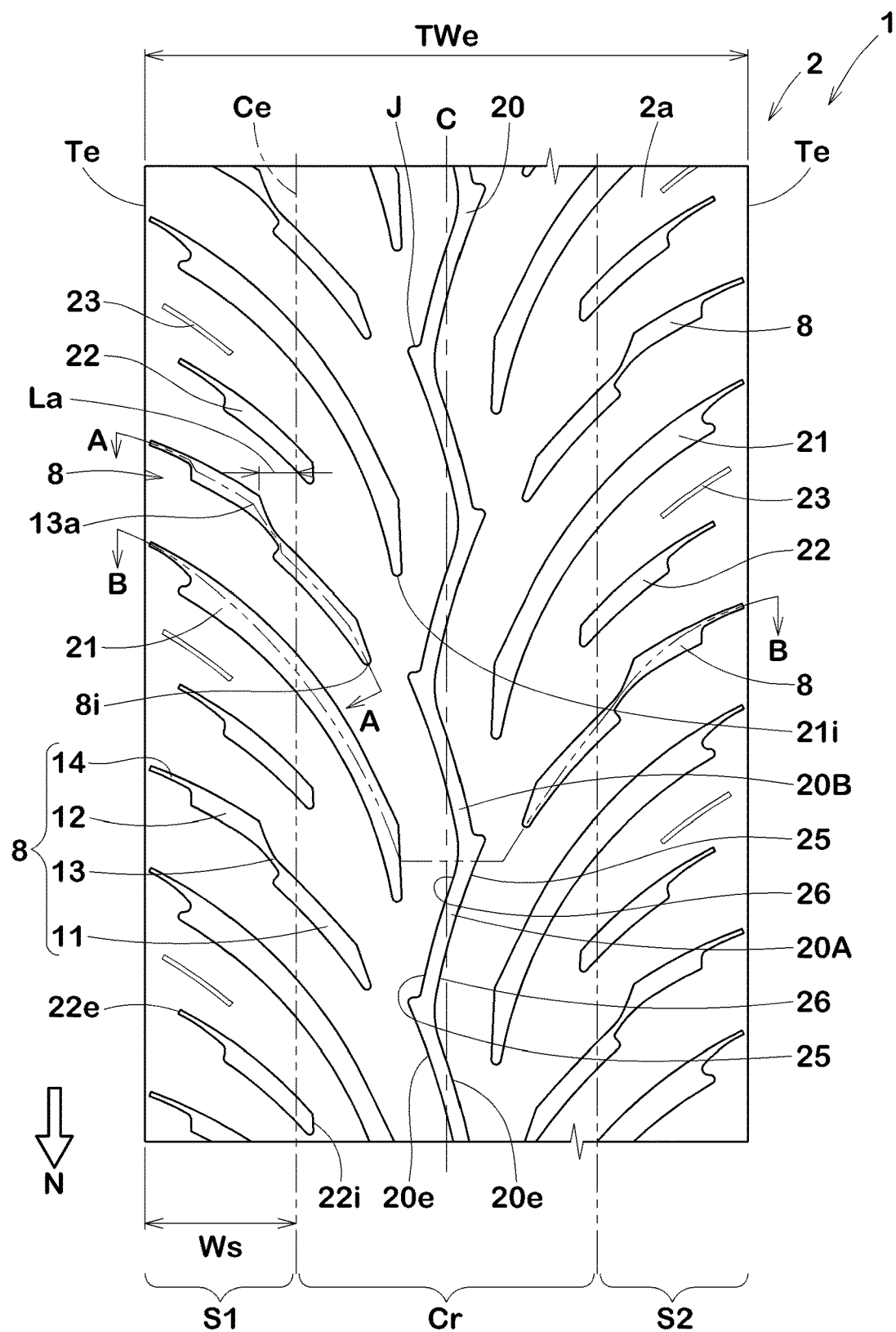
FIG. 1 is a development view of a tread portion of an embodiment according to the present disclosure.

Hereinafter, an embodiment of the present disclosure will be described with reference to the drawings. FIG. 1 is a development view of a tread portion 2 of a motorcycle tire (hereafter, it may be simply referred to as "tire".) 1 of an embodiment according to the present disclosure. The tire 1 according to the present embodiment may suitably be used for on-road driving such as on a dry asphalt road surface. Alternatively, the tire 1 according to the present disclosure is not limited to such an aspect.

The tread portion 2, in the present embodiment, includes a crown portion Cr that is a region of 50% of a tread development width TWe centered on the tire equator C, and a first shoulder portion 51 that is an outer region of the crown portion Cr (left side of the crown portion Cr in FIG. 1). In addition, the tread portion 2 includes a second shoulder portion S2 that is located on the opposite side with respect to the first shoulder portion S1 (right side of the crown portion Cr in FIG. 1). The crown portion Cr is a region that comes into contact with the ground when traveling straight mainly. The first shoulder portion 51 and the second shoulder portion S2 are regions that come into contact with the ground when turning. As used herein, the tread development width TWs is a distance in the tire axial direction between tread edges Te when the tread portion 2 is developed on a plane.

In the present embodiment, the tread portion 2 is provided with a plurality of first lateral grooves 8. Each first lateral groove 8 includes a first groove portion 11 arranged in the crown portion Cr, a second groove portion 12 arranged in the first shoulder portion S1, and a third groove portion 13 connecting the first groove portion 11 and the second groove portion 12. Since each first lateral groove 8 extends from the crown portion Cr to the first shoulder portion S1, each first lateral groove 8 can come into contact with the ground in a wide range from straight running to turning so as to improve drainage. In addition, since each first lateral groove 8 may be greater in axial length than a ground contact width when running, the air between the road surface and the groove may be discharged from the non-grounded area, improving noise resistance.

Figure 2A:
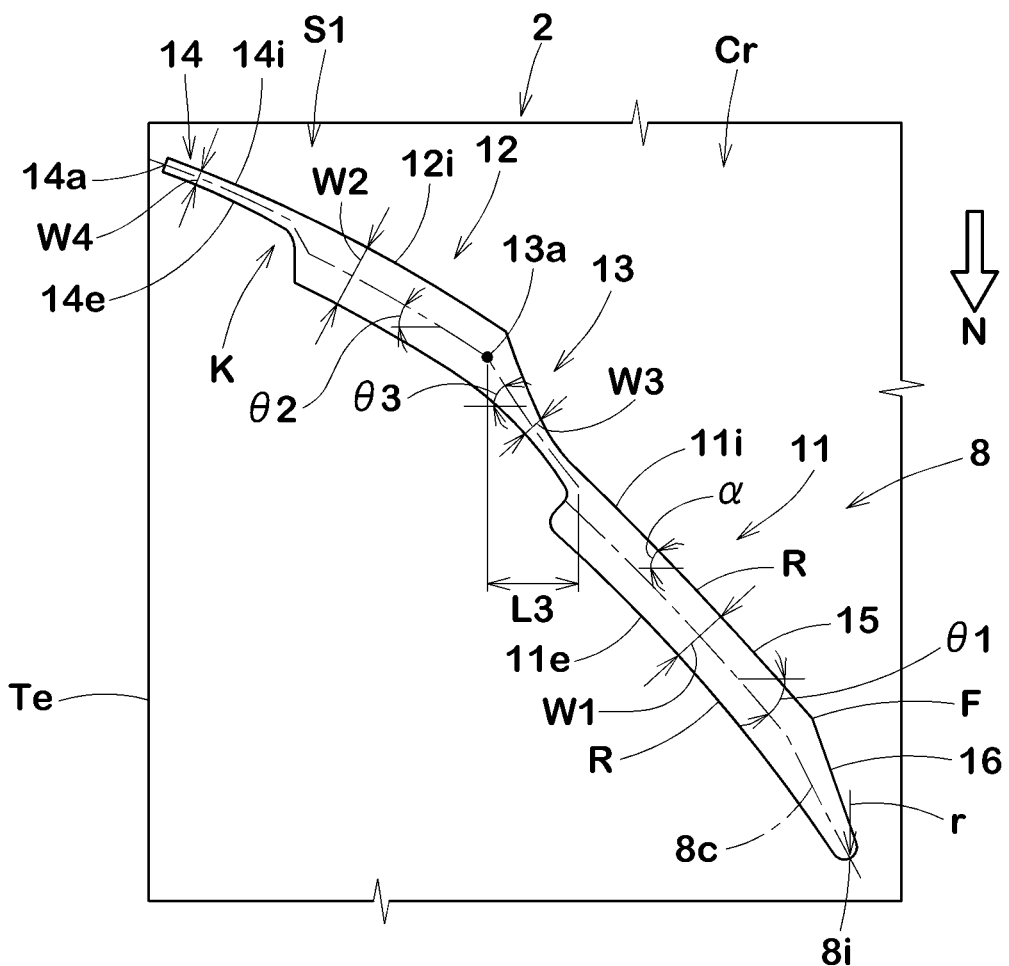
FIG. 2A is an enlarged view of a first lateral groove of FIG. 1.
Figure 2B:
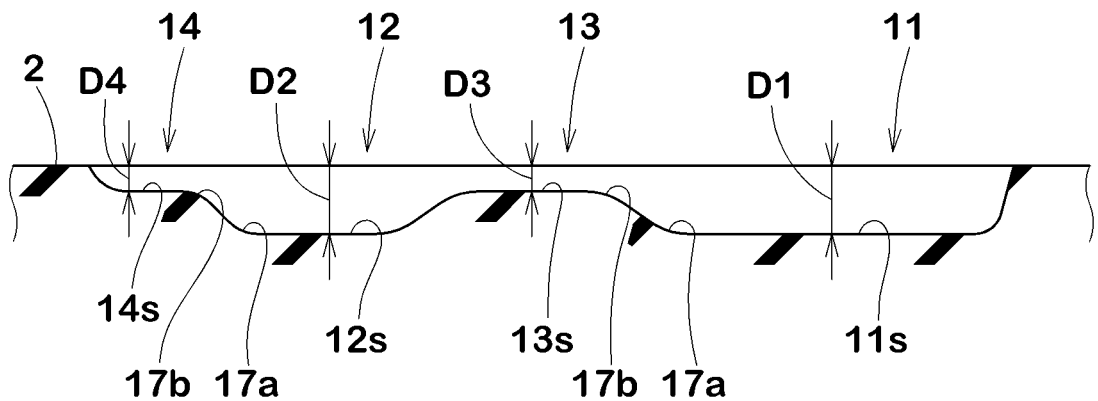
FIG. 2B is a cross-sectional view taken along the line A-A of FIG. 1.

FIG. 2A is an enlarged view of one of the first lateral grooves 8. FIG. 2B is a cross-sectional view taken along the line A-A of FIG. 1. As illustrated in FIGS. 2A and 2B, a groove depth D3 and a groove width W3 of the third groove portion 13 are respectively smaller than a groove depth D1 and a groove width W1 of the first groove portion 11. Further, the groove depth D3 and the groove width W3 of the third groove portion 13 are respectively smaller than a groove depth D2 and a groove width W2 of the second groove portion 12. Such a third groove portion 13 can suppress deformation of the first groove portion 11 and the second groove portion 12 during running to improve uneven wear resistance and vibration resistance. In addition, for wide tires 1 where a rubber thickness of the tread portion 2 tends to be small, the transient characteristics that is stability of handling during turning can be improved by providing the third groove portion 13. As used herein, unless otherwise noted, the dimensions of portions of the tire are the values measured with the tire 1 under a normal state.

As used herein, the "normal state" is such that the tire 1 is mounted onto a standard wheel rim (not illustrated) with a standard internal pressure but loaded with no tire load.

As used herein, the "standard wheel rim" is a wheel rim officially approved for each tire by standards organizations on which the tire 1 is based, wherein the standard wheel rim is the "standard rim" specified in JATMA, the "Design Rim" in TRA, and the "Measuring Rim" in ETRTO, for example.

As used herein, the "standard internal pressure" is a standard internal pressure officially approved for each tire by standards organizations on which the tire 1 is based, wherein the standard internal pressure is the "maximum air pressure" in JATMA, the maximum pressure given in the "Tire Load Limits at Various Cold Inflation Pressures" table in TRA, and the "Inflation Pressure" in ETRTO, for example.

More than 80% of a tire axial length L3 of the third groove portion 13 is located in the first shoulder portion S1. Thus, the rigidity of the first shoulder portion S1, which may receive a large camber thrust when cornering, can be maintained high, and vibration during running and uneven wear can be suppressed. Further, since the concentration of deflection in the tire 1 may be alleviated, the occurrence of cracks at the bottom of the groove can be suppressed. In the present embodiment, a 100% of the tire axial length L3 of the third groove portion 13 is located in the first shoulder portion S1.

The tread portion 2 according to the present embodiment is preferably used for a front wheel tire of motorcycles. Alternatively, the tread portion 2 according to the present embodiment may be used for a rear wheel tire.

Figure 3:
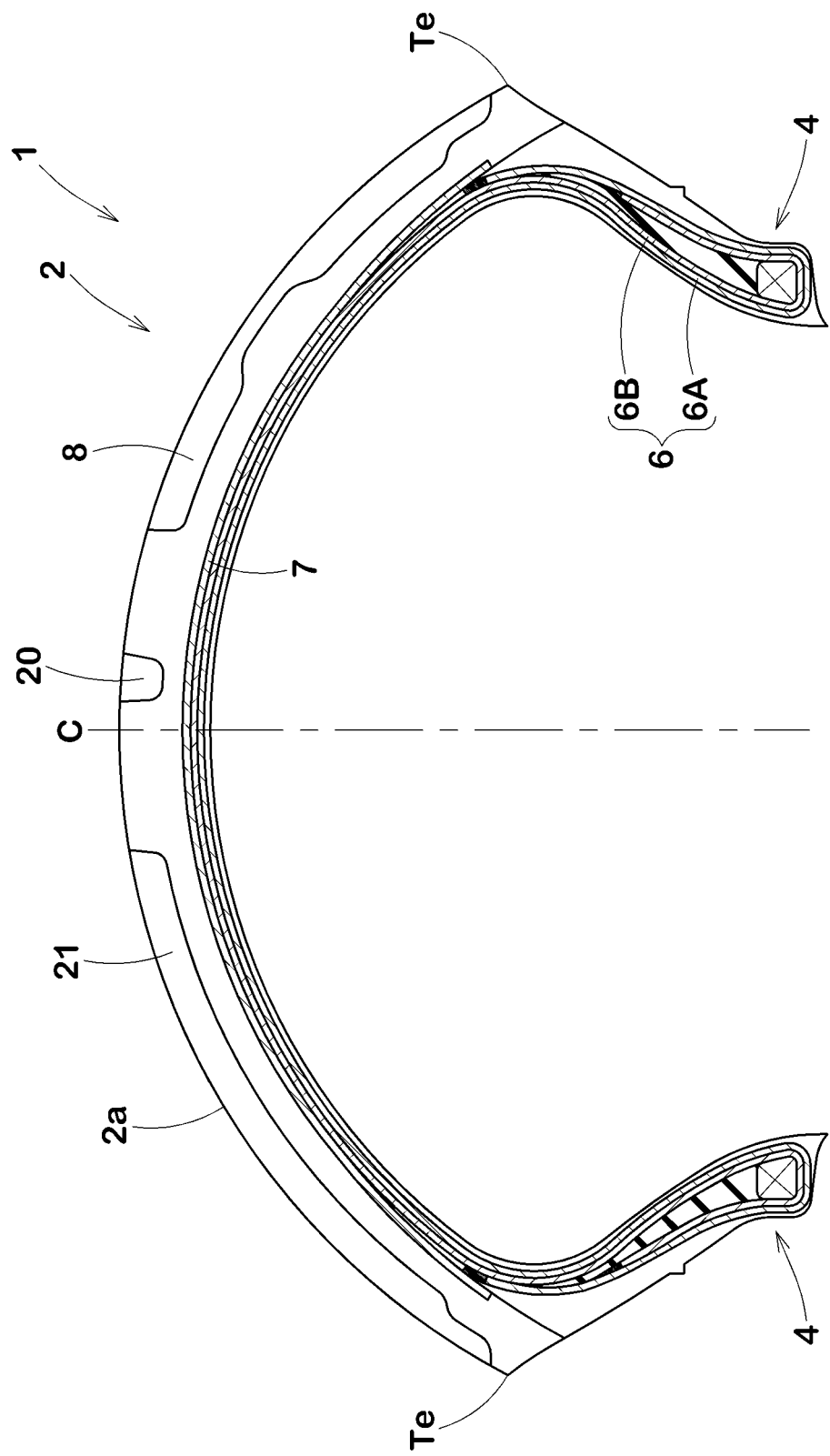
FIG. 3 is a cross-sectional view taken along the line B-B of FIG. 1.

FIG. 3 illustrates a cross-sectional view taken along the line B-B of FIG. 1. As illustrated in FIG. 3, in order to ensure a sufficient ground contact area when turning with large camber angles, the tread portion 2 of the tire 1 has a ground contact surface 2a that is curved in an arc shape manner so as to be convex outward in the tire radial direction.

The tire 1, for example, includes a carcass 6 extending between a pair of bead portions 4 and 4, and a band layer 7 disposed outward in the tire radial direction of the carcass 6 in the tread portion 2.

The carcass 6, for example, includes two carcass plies 6A and 6B which are superimposed in the tire radial direction. The carcass plies 6A and 6B, for example, include carcass cords (not illustrated) oriented at an angle of from 30 to 45 degrees with respect to the tire circumferential direction, and thus the carcass 6 is configured as a bias structure. For the carcass plies 6A and 6B, well-known cord materials can be used. Tires with a bias structure have a characteristic that the rigidity of the tread portions 2 may be smaller and these are easier to deformed than tires 1 with a radial structure. In the present disclosure, it is possible to improve vibration resistance and uneven wear resistance not only in tires having a radial structure but also in tires having a bias structure by the above configuration.

The band layer 7, in the present embodiment, includes a single band ply having a band cord (not illustrated) which is wound spirally at an angle of 5 degrees or less with respect to the tire circumferential direction. For the band ply, a well-known material can be used.

As illustrated in FIG. 1, the tread portion 2 according to the present embodiment has a designated rotation direction N. In each first lateral groove 8, the first groove portion 11 is located on a leading side than the second groove portion 12 with respect to the rotation direction N. Thus, in each first lateral groove 8, the water under the tire 1 can smoothly be discharged from the tire equator C side to the tread edge Te side by the rotation of the tire 1, and the drainage can be improved.

The first lateral grooves 8, for example, are provided on both sides of the tire equator C. In the present embodiment, the left side first lateral grooves 8 and the right side first lateral grooves 8 are arranged alternately in the tire circumferential direction. The first lateral grooves 8, in the present embodiment, do not cross the tire equator C. In other words, the first groove portions 11 are located so as not to cross the tire equator C. Such a layout can maintain the rigidity of the tread portion 2 around the tire equator C, which is subject to large ground pressure, and can maintain uneven wear resistance and vibration resistance. In the present specification, for grooves and sipes of the same shape arranged on both sides of the tire equator C, the grooves and sipes on the first shoulder portion S1 are described, and the explanation of the grooves and sipes on the second shoulder portion S2 is omitted.

As illustrated in FIG. 2A, in each first lateral groove 8, the first groove portion 11, the second groove portion 12 and the third groove portion 13, for example, are inclined in the same direction with respect to the tire axial direction. This makes the flow of water in each first lateral groove 8 smoother. Angles $\theta 1$, $\theta 2$ and $\theta 3$ with respect to the tire axial direction of the first groove portion 11, the second groove portion 12 and the third groove portion 13, respectively, are preferably in a range from 20 to 60 degrees. The absolute value of the difference among the angle $\theta 1$ of the first groove portion 11, the angle $\theta 2$ of the second groove portion 12 and the angle $\theta 3$ of the third groove portion 13 ($|\theta 1-\theta 2|$, $|\theta 2-\theta 3|$, and $|\theta 3-\theta 1|$) are preferably in a range of from 30 to 50 degrees. As used herein, each of the angles $\theta 1$, $\theta 2$ and $\theta 3$ is an average value of the maximum value and the minimum value of each of the first, second and third groove portions 11, 12 and 13, respectively.

In each first lateral groove 8, the first groove portion 11, for example, includes a first groove edge 11e located on a first side (below in FIG. 2) in the tire circumferential direction and a second groove edge iii located on a second side (above in FIG. 2) in the tire circumferential direction. The second groove edge 11i of the first groove portion 11, for example, includes a bent point F, and an angle of the second groove edge 11i with respect to the tire axial direction changes locally via the bent point F. The second groove edge 11i includes an outer portion 15 located outward in the tire axial direction of the bent point F, and an inner portion 16 located inward in the tire axial direction of the bent point F. The first groove edge 11e of the first groove portion 11 extends smoothly without having a bent portion. The first groove edge 11e and the second groove edge 11i, for example, are connected to an inner end 8i of the first lateral groove 8. The inner end 8i, in the present specification, is the innermost end in the tire axial direction of the groove centerline 8c of the first lateral groove 8. In addition, the inner end 8i includes an arc portion having a radius of curvature r of equal to or less than 2 mm in this specification.

The first groove edge 11e and the outer portion 15, for example, include arc portions R extending in an arc shape manner so as to be convex in one direction in the tire circumferential direction. The arc portions R of the first groove edge 11e and the outer portion 15, in the present embodiment, protrude toward the rearward with respect to the rotation direction N. The inner portion 16 according to the present embodiment extends straight.

Figure 4:
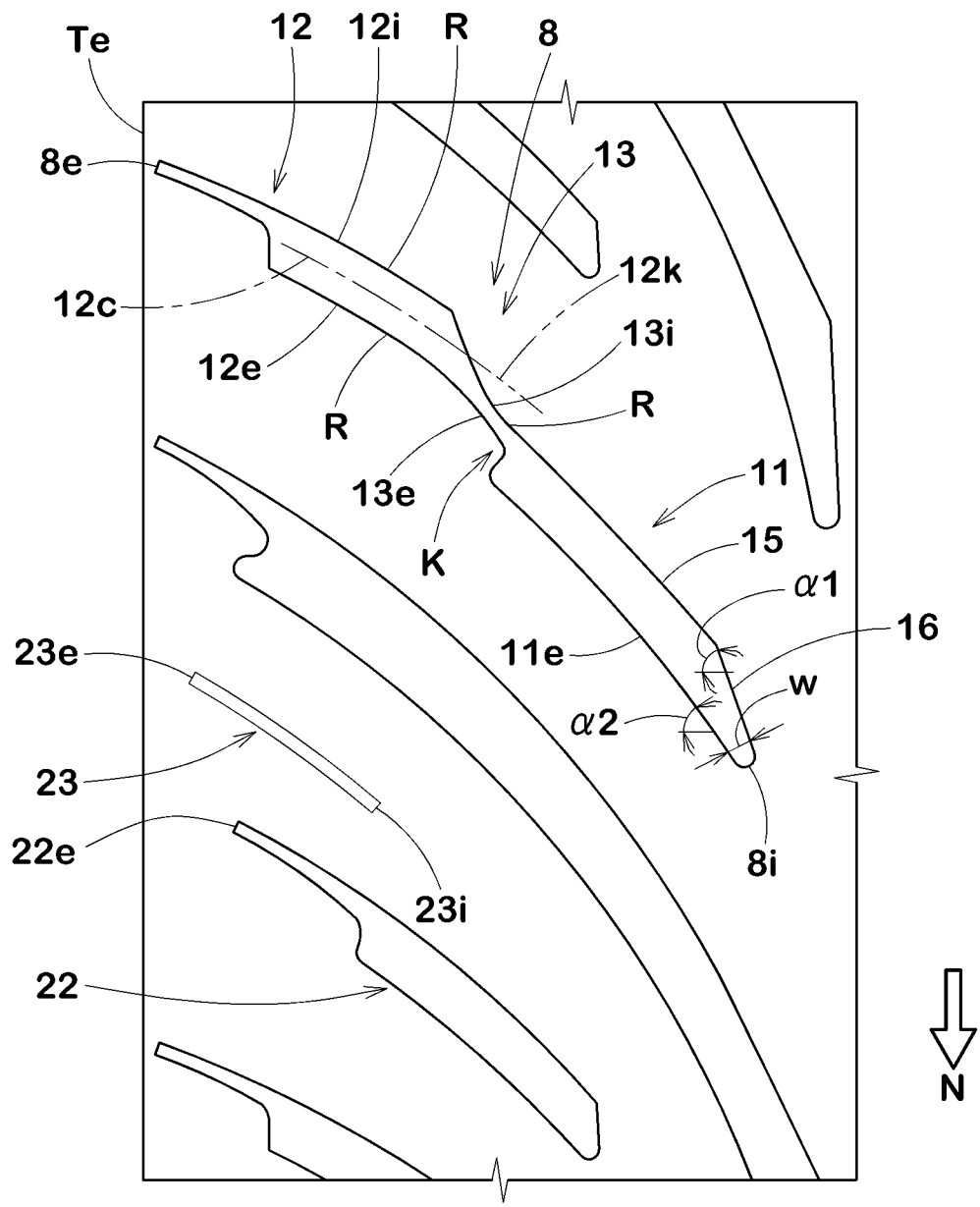
FIG. 4 is an enlarged view of some first lateral grooves of FIG. 1.

FIG. 4 illustrates an enlarged view of one of the first lateral grooves 8. As illustrated in FIG. 4, in each first lateral groove 8, an angle α1 with respect to the tire axial direction of the inner portion 16 is greater than an angle α2 with respect to the tire axial direction of the first groove edge 11e. Thus, the first groove portion 11 formed by the inner portion 16 has a groove width w tapering toward the inner end 8i. Such a first groove portion 11 can smoothly guide water and air into the first groove portion 11 utilizing the rotation of the tire 1 while suppressing the decrease in rigidity of the crown portion Cr.

The second groove portion 12, for example, includes a first groove edge 12e located on the first side in the tire circumferential direction and a second groove edge 12i located on the second side in the tire circumferential direction. The first groove edge 12e and the second groove edge 12i, for example, include arc portions R extending in an arc shape manner so as to be convex in one direction (the first side) in the tire circumferential direction. The arc portions R of the first groove edge 12e and the second groove edge 12i, in the present embodiment, protrude toward rearward with respect to the rotation direction N.

The third groove portion 13 is arranged nearer to the second groove edge 11i of the first groove portion 11 than the first groove edge 11e of the first groove portion 11, and is arranged nearer to the first groove edge 12e of the second groove portion 12 than the second groove edge 12i of the second groove portion 12. In other words, in each first lateral groove 8 according to the present embodiment, a virtual line 12k in which the groove centerline 12c of the second groove portion 12 is expanded inward smoothly in the tire axial direction is located on the rearward than the third groove portion 13 in the rotation direction N. This feature may help to suppress cracks on the groove bottom of the first lateral groove 8.

The third groove portion 13, for example, includes a first groove edge 13e located on the first side in the tire circumferential direction and a second groove edge 13i located on the second side in the tire circumferential direction. The first groove edge 13e of the third groove portion 13, for example, includes a crank-shaped portion K that extends in a crank shape manner toward the first groove edge 11e of the first groove portion 11. The second groove edge 13i of the third groove portion 13, for example, includes an arc portion R that is convex on the opposite side to the convex of the second groove edge 11i of the first groove portion 11.

In the present embodiment, the groove width w of the third groove portion 13 suddenly decreases between the first groove portion 11 and the second groove portion 12. Preferably, a ratio of the change of the groove width w to a unit length of the groove is equal to or more than 0.4.

As illustrated in FIG. 2A, in each first lateral groove 8, the groove width W3 of the third groove portion 13 is preferably equal to or more than 15% of the groove widths W1 and W2 of the first groove portion 11 and the second groove portion 12, respectively, more preferably equal to or more than 20%, but preferably equal to or less than 50% of the groove widths W1 and W2, more preferably equal to or less than 45%. When the groove width W3 of the third groove portion 13 is equal to or more than 15% of the groove widths W1 and distorted W2 of the first groove portion 11 and the second groove portion 12, respectively, drainage can be ensured. When the groove width W3 of the third groove portion 13 is equal to or less than 50% of the groove widths W1 and distorted W2 of the first groove portion 11 and the second groove portion 12, respectively, uneven wear resistance and vibration resistance can be improved. Note that in each first lateral groove 8, the groove width W3 of the third groove portion 13 means the minimum groove width of the third groove portion 13. Further, note that in each first lateral groove 8, the groove widths W1 and W2 of the first groove portion 11 and the second groove portion 12 are the maximum groove width of the first groove portion 11 and the maximum groove width of the second groove portion 12, respectively. Although not particularly limited, the groove width W1 of each first groove portion 11 is in a range from 3.5 to 7.0 mm.

As illustrated in FIG. 2B, from a similar point of view, in each first lateral groove 8, the groove depth D3 of the third groove portion 13 is preferably equal to or more than 15% of the groove depths D1 and D2 of the first groove portion 11 and the second groove portion 12, respectively, more preferably equal to or more than 20%, but preferably equal to or less than 50% of the groove depths D1 and D2 of the first groove portion 11 and the second groove portion 12, respectively, more preferably equal to or less than 45%. Note that in each first lateral groove 8, the groove depth D3 of the third groove portion 13 means the minimum groove depth of the third groove portion 13. Further, note that in each first lateral groove 8, the groove depths D1 and D2 of the first groove portion 11 and the second groove portion 12, respectively, are the maximum groove depths of the first groove portion 11 and the maximum groove depth of the second groove portion 12, respectively. Although not particularly limited, the groove depth D1 of each first groove portion 11 is in a range from 3.0 to 7.5 mm.

As illustrated in FIG. 2A, the length L3 in the tire axial direction of the third groove portion 13 is preferably equal to or more than 10% of a development length Ws (shown in FIG. 1) in the tire axial direction of the first shoulder portion S1, more preferably, equal to or more than 15%, but preferably equal to or less than 30% of the development length Ws, more preferably equal to or less than 25%.

Each first lateral groove 8, for example, further includes a fourth groove portion 14 extending outward in the tire axial direction from the second groove portion 12. A groove width W4 of the fourth groove portion 14 is smaller than the groove widths W1 and W2 of the first groove portion 11 and the second groove portion 12, respectively. Further, a groove depth D4 of the fourth groove portion 14 is smaller than the groove depths D1 and D2 of the first groove portion 11 and the second groove portion 12, respectively. Such a fourth groove portion 14 can also enhance drainage and suppress uneven wear resistance and deterioration of vibration resistance. The fourth groove portion 14 can come into contact with the ground during turning with large camber angles. Hence, by setting the groove depth D4 and the groove width W4 of the fourth groove portion 14 small as described above, the reduction in rigidity of the ground contact surface 2a can be prevented. Thus, a rider of a motorcycle during turning with large camber angles can return the motorcycle smoothly to straight running condition. Therefore, handling of motorcycle can be lighter. In the present embodiment, the fourth groove portion 14 is greater in axial length than the third groove portion 13, and the fourth groove portion is smaller in angle with respect to the tire axial direction than the third groove portion.

In the present embodiment, the groove depth D4 and the groove width W4 of the fourth groove portion 14, for example, are substantially the same as the groove depth D3 and the groove width W3 of the third groove portion 13, respectively. Such a fourth groove portion 14 can effectively exert the above-mentioned effects. The above-mentioned "substantially the same" means that the difference between the groove depth D4 of the fourth groove portion 14 and the groove depth D3 of the third groove portion 13 is within 2 mm. It also means that the difference between the groove width W4 of the fourth groove portion 14 and the groove width W3 of the third groove portion 13 is within 2 mm.

Each fourth groove portion 14, in the present embodiment, is inclined in the same direction as the inclination direction of the second groove portion 12 with respect to the tire circumferential direction. Such a fourth groove portion 14 can maintain smooth water flow in the first lateral groove 8.

An outer end 14a in the tire axial direction of each fourth groove portion 14 is located within the first shoulder portion S1. In other words, each fourth groove portion 14 terminates within the first shoulder portion S1 so as not to traverse the tread edge Te. Such a fourth groove portion 14 can suppress the decrease in rigidity of the tread portion 2 on the tread edge Te on which a large lateral force acts.

In each first lateral groove 8, the fourth groove portion 14 is arranged nearer to the second groove edge 12i of the second groove portion 12 than the first groove edge 12e of the second groove portion 12. Each fourth groove portion 14 includes a first groove edge 14e on the first side in the tire circumferential direction and a second groove edge 14i located on the second side in the tire circumferential direction. The second groove edge 14i of the fourth groove portion 14 is connected to the second groove edge 12i of the second groove portion 12 so as to form a single circular arc. The first groove edge 14e of the fourth groove portion 14 includes a crank-shaped portion K extending in a crank shape manner and connected to the second groove edge 12e of the second groove portion 12.

As illustrated in FIG. 2B, a groove bottom 11s of the first groove portion 11 and a groove bottom 13s of the third groove portion 13 are smoothly connected. A groove bottom 12s of the second groove portion 12 and a groove bottom 13s of the third groove portion 13 are smoothly connected. Further, the groove bottom 12s of the second groove portion 12 and a groove bottom 14s of the fourth groove portion 14 are smoothly connected. Such a first lateral groove 8 can suppress the occurrence of cracks at the groove bottoms and smooth the flow of water in the groove. The above-mentioned "smoothly connected" means that each connected portion among the groove bottoms 11s, 13s, 12s, and 14s includes an inner arc portion 17a which is convex inward in the tire radial direction, and an outer arc portion 17b which is convex outward in the tire radial direction and is located outward in the tire radial direction than the inner arc portion 17a.

As illustrated in FIG. 1, the tread portion 2, for example, is provided with a circumferential groove 20, a plurality of second lateral grooves 21, a plurality of third lateral grooves 22, and a plurality of sipes 23. As used herein, the grooves such as the first lateral grooves 8 and the circumferential groove 20 are voids that have a maximum groove width greater than 1.5 mm. As used herein, "sipe" means an incision that has a maximum width equal to or less than 1.5 mm.

The circumferential groove 20, for example, extends continuously in the tire circumferential direction on the tire equator C. The circumferential groove 20 according to the present embodiment extends in a zigzag manner which includes first portions 20A inclined in a first direction (downward left in FIG. 1) with respect to the tire circumferential direction and second portions 20B inclined in the opposite direction to the first portions 20A with respect to the tire circumferential direction.

The circumferential groove 20 includes a pair of groove edges 20e and 20e. Since the circumferential groove 20 extends on the tire equator C in a zigzag manner, each of the pair of groove edges 20e includes outer portions 25 located outward in the tire axial direction than the other groove edge, and inner portions 26 located inward in the tire axial direction than the other groove edge, wherein the outer portions 25 and the inner portions 26 are arranged alternately in the tire circumferential direction. In connecting portions between the first portions 20A and the second portions 20B, the outer portions 25 are configured to include axial portions J that extend in the tire axial direction. Such an axial portion J can collect water under the ground contact surface 2a into the circumferential groove 20 to improve drainage.

In the present embodiment, the second lateral grooves 21, the third lateral grooves 22 and the sipes 23 are arranged on both sides of the tire equator C. The second lateral grooves 21, the third lateral grooves 22 and the sipes 23, for example, are inclined rearward in the rotation direction N toward the respective tread edges Te. In the present embodiment, the second lateral grooves 21, the third lateral grooves 22 and the sipes 23 are curved in an arc manner so as to be convex rearward in the rotation direction N. The second lateral grooves 21, the third lateral grooves 22 and the sipes 23, for example, terminate without reaching the tread edges Te.

On the left side of the tire equator C, the second lateral grooves 21, for example, extend from the crown portion Cr to the first shoulder portion S1. In the present embodiment, the second lateral grooves 21 have a length in the tire axial direction greater than that of the first lateral grooves 8. Inner ends 21i in the tire axial direction of the second lateral grooves 21, for example, are located nearer to the tire equator C than the inner ends 8i of the first lateral grooves 8.

On the left side of the tire equator C, the third lateral grooves 22, for example, extend from the crown portion Cr to the first shoulder portion S1. The third lateral grooves 22 have a length in the tire axial direction smaller than that of the first lateral grooves 8. Axial inner ends 22i of the third lateral grooves 22 are located nearer to the tread edge Te than the inner ends 8i of the first lateral grooves 8. Axial outer ends 22e of the third lateral grooves 22 are located nearer to the tire equator C than the outer ends 8e (shown in FIG. 4) of the first lateral grooves 8.

On the left side of the tire equator C, as illustrated in FIG. 4, the sipes 23 are arranged in the first shoulder portion S1. Inner ends 23i in the tire axial direction of the sipes 23 are located within the first shoulder portion S1. Outer ends 23e in the tire axial direction of the sipes 23 are, in the tire axial direction, arranged between the outer ends 8e of the first lateral grooves 8 and the outer ends 22e of the third lateral grooves 22.

Figure 5:
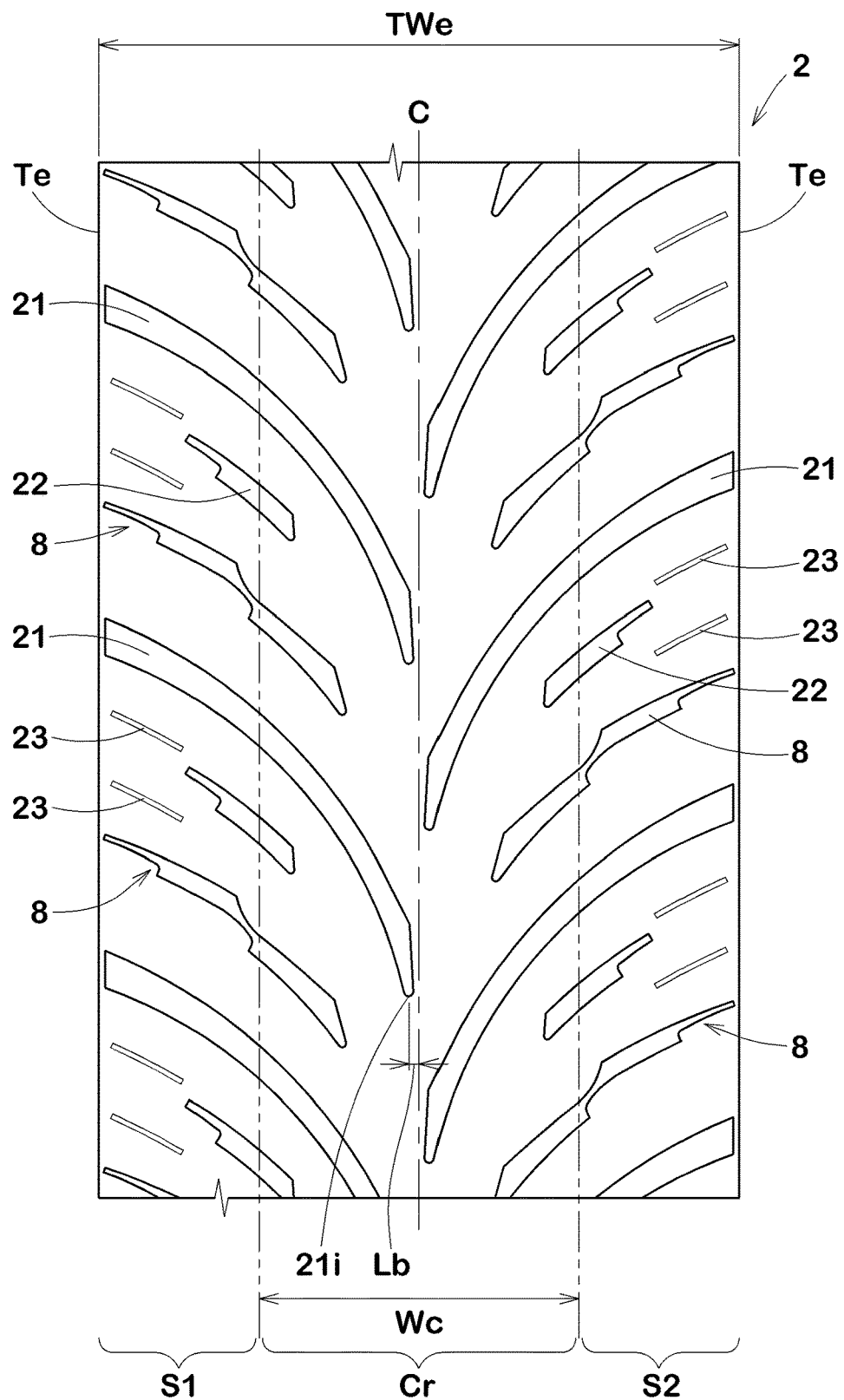
FIG. 5 is a development view of the tread portion according to another embodiment.

FIG. 5 illustrates a development view of the tread portion 2 in accordance with another embodiment. The same elements which have already explained in the above embodiment are designated by the same reference numerals and the description thereof may be omitted. In this embodiment, the tread portion 2 is preferably used for rear wheel tires of motorcycles. Alternatively, the tread portion 2 may be used for front wheel tires.

As illustrated in FIG. 5, the tread portion 2 according to the present embodiment includes the first lateral grooves 8, the second lateral grooves 21, the third lateral grooves 22 and the sipes 23. The tread portion 2 according to this embodiment is not provided with any circumferential grooves. As to the sipes 23, for example, a set of two sipes are provided in each region between one of the first lateral grooves 8 and one of the second lateral grooves 21 which are directly adjacent in the tire circumferential direction.

In this embodiment, the inner ends 21*i* of the second lateral grooves 21 are located inward in the tire axial direction than the inner ends 21*i* of the second lateral grooves 21 of the previous embodiment. This can suppress the deterioration of drainage. The shortest distance Lb between the inner ends 21*i* of the second lateral grooves 21 and the tire equator C is preferably equal to or more than 0.5%, more preferably equal to or more than 0.7%, of a development width We of the crown portion Cr, but preferably equal to or less than 2.0%, more preferably equal to or less than 2.5% of the width Ws.

Motorcycles include front wheel tires and rear wheel tires (not illustrated). Rear wheel tires are not significantly affected by the rider's steering wheel operation. For such tires, grip performance is more important than handling performance. Thus, it is preferable that a land ratio of the tread portion 2 of the rear wheel tires is larger than a land ratio of the tread portion 2 of the front wheel tire. In particular, a land ratio of the tread portion 2 of rear wheel tires is preferably equal to or more than 80%.

Although some particularly preferable embodiments of the present disclosure have been described in detail above, the present disclosure is not limited to the embodiments shown in drawings.

Working Example

Motorcycle tires with the basic tread pattern of FIG. 1 was prepared. Then, handling performance, drainage performance, uneven wear resistance, durability, vibration resistance, and noise resistance of each test tire were tested. The common specifications and test methods for each sample tire are as follows.

Handling Performance, Uneven Wear Resistance, Durability, Vibration Resistance, Noise Resistance Test:

Each test tire was mounted on the front wheel of a motorcycle (displacement 1500 cc) under the following conditions. The same tire with a tread pattern was used for the rear wheel tire. Then, a test rider drove the motorcycle on a dry asphalt road surface, and lightness of handling, degree of vibration and noise at that time were evaluated by the sensuality of the test rider. In addition, occurrence of uneven wear after running and the occurrence of cracks on the bottoms of grooves were checked. The test results are shown in Table 1 using scoring with Ref 1 as 100. Each performance is better when the numerical value is larger, wherein 95 or more is passed.

Front Tire Specifications (Size, Rim, Internal Pressure):
  110/70-13M/C, 13×3.00MT, 200 kPa
Rear Wheel Tire Specifications (Size, Rim, Internal Pressure):
  130/70-13M/C, 13×3.50MT, 225 kPa Drainage Test:

Using the above motorcycle, the test rider drove the motorcycle on a wet asphalt road surface, and the ease of running at that time was evaluated by the sensuality of the test rider. The test results are shown in Table 1 using a score with Ref 1 as 100. The larger the value, the better the drainage property, wherein 95 or more is passed.

Table 1 shows the test results.

In Table 1, "A" represents that the positions of the second groove portions are at the positions shown in FIG. 1.

"B" represents that the second groove portions are located in the crown portion.

"C" represents that the positions of the third groove portions are at the positions shown in FIG. 1.

"D" represents that the third groove portions are located in the crown portion.

"E" represents that 80% of the length of each third groove portion is located in the first shoulder portion.

"F" represents that 70% of the length of each third groove portion is located in the first shoulder portion.

"G" represents that the bottoms of the groove portions of each first lateral groove is configured as the embodiment shown in FIG. 2B.

"H" represents that the bottoms of the groove portions of each first lateral groove are connected in a straight-line shape.

"I" represents that the inner portion of each first groove portion is in the aspect of FIG. 1.

"J" represents that the inner portion of each first groove portion extends with a constant width.

The lengths of the third groove portions are all the same.

TABLE 1

| | Ref. 1 | Ref. 2 | Ref. 3 | Ex. 1 | Ex. 2 | Ex. 3 | Ex. 4 | Ex. 6 | Ex. 6 | Ex. 7 | Ref. 4 |
|---|---|---|---|---|---|---|---|---|---|---|---|
| Locations of second groove portions of first lateral grooves | B | A | A | A | A | A | A | A | A | A | A |
| Locations of third groove portions | C | C | D | C | C | C | C | C | C | E | F |
| L3 (%) | 0 | 100 | 100 | 100 | 100 | 100 | 100 | 100 | 100 | 100 | 100 |
| D3/D1 (%) | 25 | 100 | 25 | 25 | 25 | 50 | 25 | 25 | 25 | 25 | 25 |
| W3/W1 (%) | 25 | 25 | 25 | 25 | 25 | 50 | 25 | 25 | 25 | 25 | 25 |
| Fourth groove portions | applied | applied | applied | applied | none | applied | applied | applied | applied | applied | applied |
| D4/D1 (%) | 25 | 25 | 25 | 25 | — | 25 | 50 | 25 | 25 | 25 | 25 |
| Shapes of groove bottoms of first lateral grooves | G | G | G | G | G | G | G | H | G | G | G |
| Shapes of inner portions of first groove portions | I | I | I | I | I | I | I | I | J | I | I |
| Handling performance [score: Larger is better.] | 100 | 100 | 95 | 100 | 95 | 95 | 100 | 100 | 100 | 100 | 100 |
| Uneven wear resistance [score: Larger is better.] | 100 | 95 | 90 | 105 | 105 | 100 | 100 | 95 | 95 | 100 | 90 |
| Durability [score: Larger is better.] | 100 | 95 | 100 | 100 | 105 | 100 | 100 | 95 | 95 | 100 | 100 |
| Vibration resistance [score: Larger is better.] | 100 | 90 | 95 | 105 | 105 | 105 | 100 | 100 | 100 | 105 | 95 |

TABLE 1-continued

| | Ref. 1 | Ref. 2 | Ref. 3 | Ex. 1 | Ex. 2 | Ex. 3 | Ex. 4 | Ex. 6 | Ex. 6 | Ex. 7 | Ref. 4 |
|---|---|---|---|---|---|---|---|---|---|---|---|
| Noise resistance [score: Larger is better.] | 100 | 105 | 105 | 100 | 100 | 100 | 100 | 105 | 105 | 100 | 100 |
| Drainage performance [score: Larger is better.] | 100 | 115 | 110 | 110 | 105 | 115 | 115 | 115 | 115 | 110 | 105 |

As a result of the tests, it is understood that the tires of example have improved drainage performance without impairing the uneven wear resistance and vibration resistance as compared with the tires of comparative example.

The following additional notes are disclosed regarding the above-described embodiments.

[Additional Note 1]

A motorcycle tire comprising:
a tread portion comprising a crown portion that is a region of 50% of a tread development width centered on a tire equator, a first shoulder portion that is an outer region of the crown portion, and a plurality of first lateral grooves,
each of the plurality of first lateral grooves comprising a first groove portion arranged in the crown portion, a second groove portion arranged in the first shoulder portion, and a third groove portion connecting the first groove portion and the second groove portion,
wherein
a groove depth and a groove width of the third groove portion are respectively smaller than a groove depth and a groove width of the first groove portion,
the groove depth and the groove width of the third groove portion are respectively smaller than a groove depth and a groove width of the second groove portion, and
more than 80% of a tire axial length of the third groove portion is located in the first shoulder portion.

[Additional Note 2]

The motorcycle tire according to Additional note 1, wherein in each of the plurality of first lateral grooves, the first groove portion does not cross the tire equator.

[Additional Note 3]

The motorcycle tire according to Additional note 1 or 2, wherein in each of the plurality of first lateral grooves, the first groove portion, the second groove portion and the third groove portion are inclined in a same direction with respect to the tire axial direction.

[Additional Note 4]

The motorcycle tire according to any one of Additional notes 1 to 3, wherein in each of the plurality of first lateral grooves, the groove width of the third groove portion is in a range from 15% to 50% of the groove width of the first groove portion and the groove width of the second groove portion.

[Additional Note 5]

The motorcycle tire according to anyone of Additional notes 1 to 4, wherein in each of the plurality of first lateral grooves, the groove depth of the third groove portion is in a range from 15% to 50% of the groove depth of the first groove portion and the groove depth of the second groove portion.

[Additional Note 6]

The motorcycle tire according to any one of Additional notes 1 to 5, wherein in each of the plurality of first lateral grooves,
the first groove portion comprises a first groove edge located on a first side in a tire circumferential direction and a second groove edge located on a second side in the tire circumferential direction,
the second groove portion comprises a first groove edge located on the first side in the tire circumferential direction and a second groove edge located on the second side in the tire circumferential direction, and
the third groove portion is arranged nearer to the second groove edge of the first groove portion than the first groove edge of the first groove portion, and is arranged nearer to the first groove edge of the second groove portion than the second groove edge of the second groove portion.

[Additional Note 7]

The motorcycle tire according to any one of Additional notes 1 to 6, wherein
each of the plurality of first lateral grooves further comprises a fourth groove portion extending outward in the tire axial direction from the second groove portion, and
a groove depth and a groove width of the fourth groove portion is respectively smaller than the groove depths and the groove widths of the first groove portion and the second groove portion, respectively.

[Additional Note 8]

The motorcycle tire according to Additional note 7, wherein
in each of the plurality of first lateral grooves,
the first groove portion, the second groove portion, the third groove portion, and the fourth groove portion are inclined in a same direction with respect to the tire axial direction.

[Additional Note 9]

The motorcycle tire according to any one of Additional notes 1 to 8, wherein
the tread portion has a designated rotation direction, and
the first groove portion is located on a leading side than the second groove portion with respect to the rotation direction.

[Additional Note 10]

The motorcycle tire according to any one of Additional notes 1 to 9, further comprising a carcass having a bias structure.

[Additional Note 11]

A set of motorcycle tires comprising:
a motorcycle tire for front wheel according to any one of Additional notes 1 to 10, and
a motorcycle tire for rear wheel according to any one of Additional notes 1 to 10,
wherein
a land ratio of the motorcycle tire for rear wheel is greater than a land ratio of the motorcycle tire for front wheel.

The invention claimed is:

1. A motorcycle tire comprising:
a tread portion comprising a crown portion that is a region of 50% of a tread development width centered on a tire equator, a first shoulder portion that is an outer region of the crown portion, and a plurality of first lateral grooves, each of the plurality of first lateral grooves comprising a first groove portion arranged in the crown portion, a second groove portion arranged in the first shoulder portion, and a third groove portion connecting the first groove portion and the second groove portion,
wherein
a groove depth and a groove width of the third groove portion are respectively smaller than a groove depth and a groove width of the first groove portion,
the groove depth and the groove width of the third groove portion are respectively smaller than a groove depth and a groove width of the second groove portion,
more than 80% of a tire axial length of the third groove portion is located in the first shoulder portion,
each of the plurality of first lateral grooves further comprises a fourth groove portion extending outward in a tire axial direction from the second groove portion,
a groove depth and a groove width of the fourth groove portion are respectively smaller than the groove depths and the groove widths of the first groove portion and the second groove portion, respectively,
the second groove portion includes a first groove edge located on a first side in a tire circumferential direction and a second groove edge located on a second side in the tire circumferential direction,
the fourth groove portion includes a first groove edge on the first side in the tire circumferential direction and a second groove edge located on the second side in the tire circumferential direction,
the first groove edge of the fourth groove portion is offset toward the second side in the tire circumferential direction from an extension line of the first groove edge of the second groove portion, and
the second groove edge of the fourth groove portion is connected to the second groove edge of the second groove portion so as to form a single circular arc with each other.

2. The motorcycle tire according to claim 1, wherein
in each of the plurality of first lateral grooves, the first groove portion does not cross the tire equator.

3. The motorcycle tire according to claim 2, wherein
in each of the plurality of first lateral grooves,
the first groove portion comprises a first groove edge located on the first side in the tire circumferential direction and a second groove edge located on the second side in the tire circumferential direction,
and
the third groove portion is arranged nearer to the second groove edge of the first groove portion than the first groove edge of the first groove portion, and is arranged nearer to the first groove edge of the second groove portion than the second groove edge of the second groove portion.

4. The motorcycle tire according to claim 1, wherein
in each of the plurality of first lateral grooves, the first groove portion, the second groove portion and the third groove portion are inclined in a same direction with respect to the tire axial direction.

5. The motorcycle tire according to claim 4, wherein
in each of the plurality of first lateral grooves,
the first groove portion comprises a first groove edge located on the first side in the tire circumferential direction and a second groove edge located on the second side in the tire circumferential direction,
and
the third groove portion is arranged nearer to the second groove edge of the first groove portion than the first groove edge of the first groove portion, and is arranged nearer to the first groove edge of the second groove portion than the second groove edge of the second groove portion.

6. The motorcycle tire according to claim 1, wherein
in each of the plurality of first lateral grooves, the groove width of the third groove portion is in a range from 15% to 50% of the groove width of the first groove portion and the groove width of the second groove portion.

7. The motorcycle tire according to claim 6, wherein
in each of the plurality of first lateral grooves,
the first groove portion comprises a first groove edge located on the first side in the tire circumferential direction and a second groove edge located on the second side in the tire circumferential direction,
and
the third groove portion is arranged nearer to the second groove edge of the first groove portion than the first groove edge of the first groove portion, and is arranged nearer to the first groove edge of the second groove portion than the second groove edge of the second groove portion.

8. The motorcycle tire according to claim 6, wherein
in each of the plurality of first lateral grooves, an entire length of the third groove portion is located within the first shoulder portion.

9. The motorcycle tire according to claim 1, wherein
in each of the plurality of first lateral grooves, the groove depth of the third groove portion is in a range from 15% to 50% of the groove depth of the first groove portion and the groove depth of the second groove portion.

10. The motorcycle tire according to claim 9, wherein
in each of the plurality of first lateral grooves,
the first groove portion comprises a first groove edge located on the first side in the tire circumferential direction and a second groove edge located on the second side in the tire circumferential direction,
and
the third groove portion is arranged nearer to the second groove edge of the first groove portion than the first groove edge of the first groove portion, and is arranged nearer to the first groove edge of the second groove portion than the second groove edge of the second groove portion.

11. The motorcycle tire according to claim 1, wherein
in each of the plurality of first lateral grooves,
the first groove portion comprises a first groove edge located on the first side in the tire circumferential direction and a second groove edge located on the second side in the tire circumferential direction,
and
the third groove portion is arranged nearer to the second groove edge of the first groove portion than the first groove edge of the first groove portion, and is arranged nearer to the first groove edge of the second groove portion than the second groove edge of the second groove portion.

12. The motorcycle tire according to claim 11, wherein
in each of the plurality of first lateral grooves,
the second groove edge of the first groove portion comprises a bent point, and
the first groove edge of the first groove portion extends in an arc shape manner without a bent point.

13. The motorcycle tire according to claim 12, wherein
the fourth groove portion is greater in axial length than the third groove portion.

14. The motorcycle tire according to claim 13, wherein the fourth groove portion is smaller in angle with respect to the tire axial direction than the third groove portion.

15. The motorcycle tire according to claim 1, wherein in each of the plurality of first lateral grooves,
the first groove portion, the second groove portion, the third groove portion, and the fourth groove portion are inclined in a same direction with respect to the tire axial direction.

16. The motorcycle tire according to claim 1, wherein the tread portion has a designated rotation direction, and the first groove portion is located on a leading side than the second groove portion with respect to the rotation direction.

17. A set of motorcycle tires comprising:
a motorcycle tire for front wheel according to claim 1, and
a motorcycle tire for rear wheel according to claim 1, wherein
a land ratio of the motorcycle tire for rear wheel is greater than a land ratio of the motorcycle tire for front wheel.

18. The motorcycle tire according to claim 1, wherein
the first groove portion includes a first groove edge located on the first side in the tire circumferential direction and a second groove edge located on the second side in the tire circumferential direction, the second groove edge including an arc portion extending in an arc shape manner so as to be convex in the second side in the tire circumferential direction,
the third groove portion includes a first groove edge located on the first side in the tire circumferential direction and a second groove edge located on the second side in the tire circumferential direction, and
the second groove edge of the third groove portion includes an arc portion that is convex to the first side in the tire circumferential direction.

19. The motorcycle tire according to claim 1, wherein the tire axial length of the third portion is smaller than a tire axial length of the first groove portion and/or a tire axial length of the second groove portion.

\* \* \* \* \*